United States Patent [19]

Shimp

[11] Patent Number: 4,785,075
[45] Date of Patent: Nov. 15, 1988

[54] METAL ACETYLACETONATE/ALKYLPHENOL CURING CATALYST FOR POLYCYANATE ESTERS OF POLYHYDRIC PHENOLS

[75] Inventor: David A. Shimp, Prospect, Ky.

[73] Assignee: Interez, Inc., Jefferson, Ky.

[21] Appl. No.: 78,037

[22] Filed: Jul. 27, 1987

[51] Int. Cl.⁴ ............................................. C08G 83/00
[52] U.S. Cl. .................................... 528/422; 502/170; 502/171; 502/172; 525/419; 525/420; 525/436; 525/437; 525/438; 525/449; 525/467; 525/535; 528/99; 528/119; 528/211

[58] Field of Search ............... 528/422, 99, 119, 211; 525/419, 420, 436, 437, 438, 449, 467, 535

[56] References Cited

U.S. PATENT DOCUMENTS 4,709,008 11/1987 Shimp ............................... 528/422

*Primary Examiner*—Harold D. Anderson
*Attorney, Agent, or Firm*—Herbert P. Price

[57] ABSTRACT

Polycyanate esters of polyhydric phenols are cured with a liquid solution of a metal acetylacetonate in an alkylphenol. Such cured compositions are useful in structural composites, transfer molded-encapsulants, filmed structural adhesives and printed wiring boards.

36 Claims, No Drawings

4,785,075

METAL ACETYLACETONATE/ALKYLPHENOL CURING CATALYST FOR POLYCYANATE ESTERS OF POLYHYDRIC PHENOLS

BACKGROUND OF THE INVENTION

The field of art to which this invention pertains is cyanate esters and catalysts for curing such esters.

Cyanate esters, which are described in U.S. Pat. No. 3,553,244, are prepared by reacting polyhydric phenols with cyanogen chloride. Such cyanate esters can be cured by heat alone, but, preferably, are cured by using a catalyst plus heat to form thermoset resins useful as laminating and molding resins. In U.S. Pat. No. 3,962,184, the use of zinc octoate, catechol and triethylenediamine as catalysts for cyanate esters is described. This patent also describes the use of imidazoles alone or combined with organic metal salts, such as zinc octoate, tin octoate, tetrabutyl ester of titanic acid, zinc stearate, tin stearate, or calcium stearate, and phenolic compounds, such as phenol or catechol.

Other references which disclose metal salts and/or aromatic hydroxy compounds as catalysts for cyanate esters are U.S. Pat. Nos. 4,026,913, 4,110,367, 4,195,132, 4,429,112, 4,330,658 and 4,330,669.

U.S. Pat. No. 3,694,410 discloses that chelates, such as iron, cobalt, zinc, copper and manganese acetylacetonates, are useful to catalyze the cure of cyanate esters. The patent, however, does not disclose that metal acetylacetonates can be dissolved in an alkylphenol to form a liquid catalyst solution.

U.S. Pat. No. 4,604,452, discloses that metal carboxylates may be dissolved in alkylphenols to form a catalyst solution that can be added to polycyanate esters of polyhydric phenols to facilitate curing. Although a metal carboxylate of acetoacetic acid is disclosed, metal acetylacetonates are not disclosed as suitable catalysts.

Metal salts, and chelates, when used as catalysts, do not readily dissolve in undiluted cyanate esters. They can form insoluble or gel-encrusted coated droplets which remain as undesirable particulates in the cured compositions. Also such incompletely soluble catalysts require high temperatures and/or long cure times in order to complete the cure. Complete cures are obtained when substantially all of the cyanate ester groups are reacted to form triazine ring structures. Compositions which are incompletely cured will whiten, blister, become embrittled, or even soften to a slime consistency when exposed to steam over a period of time.

SUMMARY OF THE INVENTION

This invention relates to curable compositions made from polycyanate esters of polyhydric phenols. In one aspect, this invention pertains to curable compositions which are made from polycyanate esters and liquid, readily soluble, catalysts. In another aspect, this invention relates to catalyzed polycyanate ester compositions which cure completely to form heat and moisture resistant thermoset compositions.

The curable compositions of this invention are made from a polycyanate ester of a polyhydric phenol and a catalyst which is a liquid solution of a metal acetylacetonate and an alkylphenol. The metal acetylacetonate is a metal chelate wherein the preferred metal is a transition metal having nine or more electrons in the next-to-outermost shell or aluminum and is characterized as coordinating. Examples of the preferred chelated metals are copper, manganese, tin, zinc, cobalt, and nickel, all in the divalent state, manganese, iron, cobalt and aluminum, all in the trivalent state, and tetravalent titanium. The alkyl groups in the alkylphenol contain about one to about 22 carbon atoms. The soluble metal is generally present in the amount of about ten to about 10,000 ppm as metal based on the total resin weight of the polycyanate ester to be cured. The alkylphenol is used in an amount to provide from about two to about 100 milliequivalents of active hydrogen per equivalent of cyanate group, preferably from about five to about 60 milliequivalents per cyanate equivalent. Generally, the metal acetylacetonate is present in the catalyst blend, that is, the acetylacetonate dissolved in the alkylphenol, in the amount of about 0.05 to about 25 percent by weight based upon the total weight of the catalyst blend.

DESCRIPTION OF THE INVENTION

The polycyanate esters of polyhydric phenols useful in this invention are described in U.S. Pat. No. 3,553,244, which is hereby incorporated by reference. These polycyanate esters, which contain more than one cyanate ester group per molecule, are prepared by reacting a cyanogen halide with a polyhydric phenol. Examples of cyanogen halides are cyanogen iodide, cyanogen bromide and cyanogen chloride, with cyanogen chloride being preferred. Polyhydric phenols, from which these polycyanate esters are derived, include resorcinol, p,p'-dihydroxydiphenyl, o,p'-dihydroxydiphenyl methane, p,p'-dihydroxydiphenyl propane (bisphenol A as it is commonly called), p,p'-dihydroxydiphenyl sulfone, p,p'-dihydroxydiphenyl sulfide, p,p'-dihydroxydiphenyl oxide, 4,4'-methylenebis(2,6-dimethylphenol), 4,4'-(hexafluoroisopropylidene)diphenol, p,p'p'-trihydroxytriphenyl phosphate, dihydroxy naphthalene and novolac resins which contain more than 2 phenol moieties per molecule. A preferred polycyanate ester is the dicyanate ester of bisphenol A, with the most preferred being the dicyanate ester of bisphenol A having a purity equal to, or greater than, 99.0 mole percent. Partially trimerized dicyanates, termed prepolymers, which characteristically have from about 5 percent to about 60 percent of the monomeric functionality converted to triazine (or cyanurate) rings by heat processing with attendant increase in molecular weight are also catalyzed by the metal acetylacetonates and alkylphenols of this invention. The monomeric polycyanates and prepolymers obtained therefrom can be catalyzed as neat liquids, hot melts or liquid solutions.

The metal acetylacetonates are metal chelates having two or more acetylacetonate ligands attached to a central metallic atom. The preparation of metal acetylacetonates is well known. Generally, they are produced by the reaction of a soluble metal compound and acetylacetone. The resulting metallic crystalline product is highly soluble in certain organic solvents, such as alkylphenols. Metal acetylacetonates are used as catalysts for the polymerization of olefins, dienes, and epoxies.

Generally, metal acetylacetonate powders do not dissolve completely in neat cyanates. As a result, it is best to dissolve them in a solvent and then mix the solution with a polycyanate ester. In this invention, alkylphenols are the preferred solvent in which to dissolve the metal acetylacetonates because they serve as co-catalysts with the metal acetylacetonates and are nonvolatile under curing conditions.

The metals useful in this invention are coordinating metals. The preferred coordinating metals are transition metals having nine or more electrons in the next-to-outermost shell and aluminum. Examples of the preferred coordinating metals are copper, manganese, nickel, cobalt, zinc, and tin, normally or usually in the divalent state, aluminum, iron, cobalt and manganese, all in the trivalent state, and titanium in the tetravalent state. Aluminum is the only non-transition metal which exhibits a useful degree of catalytic activity as a coordinating metal in an acetylactonate chelate. The most preferred metal acetylacetonate is copper acetylacetonate.

The metal is present in the range of about 10 to about 10,000 ppm as metal based on the total resin weight of the polycyanate ester to be cured. The preferred metal range is from about 30 to about 600 ppm.

Alkylphenols useful in this invention dissolve the metal acetylacetonates forming stable solutions. Such alkylphenols contain 1 or 2 alkyl substituents, generally located para or ortho to the phenol group, wherein the total carbon atoms in the alkyl substituents will vary from about one to about 22. Such alkylphenols are hydrophobic, have low volatility and are of relatively low toxicity. Preferred alkylphenols are nonylphenol, dodecylphenol, o-cresol, 2-sec.butylphenol and 2,6-dinonylphenol. The most preferred alkylphenol is nonylphenol, which is commercially available as a mixture of the ortho and para isomers with up to about 30 weight percent ortho isomer in the mixture. These alkylphenols are used in the amount of about two to about 100 milliequivalents of active hydrogen per cyanate equivalent in the polycyanate of the polyhydric phenol, and preferably in the amount of about five to about 60 milliequivalents per cyanate equivalent. Minor portions of bisphenols can be used in conjunction with the alkylphenols provided that such blends are liquid at room temperature.

The catalyst solution, i.e., the metal acetylacetonate dissolved in the alkylphenol, can contain as little as 0.01, but preferably contains about 0.05 to about 25 percent by weight metal acetylacetonate based upon the total weight of the catalyst solution. These catalyst solutions are conveniently prepared by stirring the components at a temperature of about 150° to 300° F. until all of the metal acetylacetonate has dissolved. The catalyst blends, when cooled to room temperature, are stable liquids.

The compositions of this invention can be cured by heating at elevated temperatures for a time sufficient to obtain a complete cure. The curing reaction can be conducted at one temperature or can be conducted by heating in steps. If conducted at one temperature, the curing temperatures will vary from about 250° F. to about 450° F. When conducted by stepwise heating, the first step, or gelation step, is performed at a temperature of about 150° F. to about 350° F. The curing step is conducted at a temperature of about 300° F. to about 450° F. and the optional post-curing step is conducted at a temperature of about 400° F. to about 500° F. Generally the overall curing reaction will take from about five minutes to about eight hours.

When the polycyanate and the curing catalyst of this invention are heated, the aromatic cyanate functionality trimerizes more extensively leaving less than 20 percent, preferably, less than five percent of the original cyanate groups untrimerized. Unreacted cyanate groups in the crosslinked resin lower thermal performance and are especially deleterious to performance measured after conditioning in moist environments. With exposure to water or water vapor, cyanate functionality hydrolyzes to carbamate esters, which are both hydrophilic and function as carbon dioxide blowing agents at elevated temperatures. Residual cyanate groups in polycyanurate networks result in higher moisture absorption, which adversely affects: (a) dimensional stability (swelling and higher coefficients of thermal expansion); (b) mechanical strength and stiffness at elevated temperatures (lower heat distortion temperature); (c) electrical insulating properties; (d) stability in contact with molten solders; and (e) cyanurate hydrolysis, blistering and outgassing.

The catalysts of this invention are also useful in curing blends of polycyanate esters and polyepoxide resins wherein up to about 70 percent of the blend is the polyepoxide resin. Such polyepoxide resins are the well-known glycidyl ethers of polyhydric phenols which are made by reacting an epihalohydrin, preferably, epichlorohydrin, with a polyhydric phenol. Such polyhydric phenols are described hereinbefore in the description of polycyanate esters. Preferred polyepoxide resins are those derived from bisphenol A and tetrabromobisphenol A having an epoxide equivalent weight of about 180 to about 750.

When formulating for particular end uses, additional components can be incorporated in the polycyanate compositions. Such components include reinforcing fibers, colloidal silica flow modifiers, mineral fillers and pigments.

In addition, up to about 25 percent and preferably about 10 to about 20 percent by weight of the dicyanate ester can be replaced with thermoplastic resins prior to curing with a metal acetylacetonate to form toughened thermoset matrices. Generally, any amorphous thermoplastic resin which is initially soluble in the molten dicyanate ester being employed can be utilized. Preferably, the thermoplastic resin is a polyetherimide, polyarylate, copolyester, polysulfone or polycarbonate.

In order to achieve a uniform composite matrix upon curing, it is necessary for there to be complete solutioning of the thermoplastic resin in the dicyanate monomer or prepolymer prior to curing. This is usually accomplished by dissolving the thermoplastic resin in a suitable solvent, such as methylene chloride, adding the dicyanate monomer or prepolymer, and heating and stirring the mixture to blend the thermoplastic resin solution with the molten dicyanate monomer or prepolymer. The solvent used to dissolve the thermoplastic resin is stripped off, usually under vacuum, prior to the addition of the curing catalyst. Generally, any solvent in which the thermoplastic resin is soluble and which can be easily stripped off after the thermoplastic resin is blended with the dicyanate ester can be employed. Some polymers, such as polysulfone and polyethersulfone thermoplastic resins, can usually be dissolved in neat form directly into the molten dicyanate or prepolymer and do not require the use of a solvent. The incorporation of a thermoplastic resin prior to curing the dicyanate monomer or prepolymer can enhance some of the physical properties of the cured dicyanate, such as the toughness properties.

The cured composition of this invention can be used in vacuum bagged structural composites, transfer moldedencapsulates, filmed structural adhesives, printed wiring boards and composites for aircraft primary structures. Manufacturers of printed wiring boards, structural composites and plastic encapsulated semiconductors prefer that curing be accomplished at temperatures of 350° F. or below.

The invention is described in more detail in the following examples. Parts and percentages, unless otherwise indicated, are parts and percentages by weight.

EXAMPLE 1

The effect of nonylphenol/copper acetylactonate catalysts versus a nonylphenol/copper naphthenate catalyst on the reactivity and cured state properties of a polycyanate ester is demonstrated. Three catalyst packages were first prepared. The first package was prepared by blending 4.8 parts of nonylphenol with 0.5 part of copper naphthenate (8 percent Cu grade from Mooney Chemical Company). The second and third packages were prepared by blending 4.8 parts of nonylphenol with 0.17 and 0.08 part of copper acetylacetonate (24.2 percent Cu from Harshaw Chemical Company), respectively.

Bisphenol A dicyanate monomer (160 parts), analyzing 99.7 mole percent pure by Differential Scanning Calorimeter (DSC) melt analysis, was melted in a 250 ml. 3-neck flask in an oil bath. At a temperature of 200° F., 5.3 grams of the first catalyst package, 4.97 grams of the second catalyst package and 4.88 grams of the third catalyst package were added and stirred to dissolve the catalyst into the molten dicyanate. After vacuum deairing, each catalyzed dicyanate melt was poured into an aluminum sheet mold preheated to 220° F. and gelled. The casting was cured for a period of one hour at 350° F. and two hours at 410° F. in an oven. For each of the catalyst packages mixed with the dicyanate, an optically clear, yellow casting of ⅛ inch thickness was obtained, half of which was sawed and milled without chipping into a series of 5"×½"×⅛" test bars and tested for certain properties.

The bars were tested for dry and wet heat distortion temperature (HDT) per ASTM D-648 and for percent water absorption. Bars were conditioned for wet HDT and percent water absorption testing by sealing them in a chamber containing water at 200° F., and having a relative humidity greater than 95 percent, for 64 hours.

A second portion of the casting for each catalyst package was post-cured for two hours at 482° F. and tested in an identical manner to the bars cured at 410° C. The results, indicate that aside from an expected increase in dry HDT, little improvement in performance is achieved with higher temperature curing. The amount of catalyst components and dicyanate monomer used are listed in Table I as well as the test results of the cured products.

TABLE I
COMPARISON OF EFFECTS OF METAL ACETYLACETONATE AND METAL NAPHTHENATE ON BISPHENOL A DICYANATE HOMOPOLYMER PROPERTIES

|  | A | B | C |
|---|---|---|---|
| MATERIAL (parts) | | | |
| Dicyanate Ester | 160 | 160 | 160 |
| Nonylphenol | 4.8 | 4.8 | 4.8 |
| Copper Naphthenate (8% Cu) | 0.5 | — | — |
| Copper Acetylacetonate (24.2% Cu) | — | 0.17 | 0.08 |
| REACTIVITY AND GELATION | | | |
| Gel time @ 220° F. (min) | 30 | 110 | 155 |
| Stroke Gel @ 350° F. (min) | 1.8 | 4 | 7.5 |
| Gel time ratio (220° F./350° F.) | 16.4 | 27.5 | 20.7 |
| PROPERTIES OF CURED CASTINGS | | | |
| 410° F. Cured Castings | | | |
| HDT °C. | | | |
| Dry | 207 | 227 | 227 |
| Wet | 172 | 186 | 191 |
| % $H_2O$ Absorption | 1.38 | 1.37 | 1.28 |
| 482° F. Post Cured Castings | | | |
| HDT °C. | | | |
| Dry | 242 | 245 | 238 |
| Wet | 177 | 187 | 190 |
| % $H_2O$ Absorption | 1.78 | 1.61 | 1.56 |

EXAMPLE 2

Catalyst packages were prepared from a number of metal acetylacetonates and nonylphenol. A Bisphenol A dicyanate prepolymer of 202 equivalent weight (31 percent of cyanate groups trimerized) was cured with the catalyst blend using the procedure described in Example 1. In addition, the cured cyanate castings were evaluated for the extent of cyclotrimerization using Fourier Transform Infrared (FTIR). A small amount of a cured casting was pulverized and mixed with KBr and pressed into pellets. The ratio of the cyanate absorbance at 2270 $cm^{-1}$ to the methyl C—H stretch absorbance at 2875 $cm^{-1}$ was proportioned to that of an unheated dicyanate standard to calculate the percent of conversion.

The castings were also tested for flexure strength, flexural modulus, flexural strain, percent weight loss when exposed to 450° F. air, and percent weight gain when boiled in water. Details of the catalyst compositions and the test results of the cured castings are listed in Table II.

TABLE II
EFFECT OF METAL ACETYLACETONATE ON BISPHENOL A DICYANATE HOMOPOLYMER PROPERTIES

|  | A | B | C | D | E | F | G | H | I |
|---|---|---|---|---|---|---|---|---|---|
| Composition (parts by weight) | | | | | | | | | |
| Dicyanate Prepolymer | 100 | 100 | 100 | 100 | 100 | 100 | 100 | 100 | 100 |
| Catalyst Blend: | | | | | | | | | |
| Nonylphenol Acetylacetonate | 2 | 2 | 2 | 2 | 2 | 2 | 2 | 2 | 2 |
| Metal | $Cu^{+2}$ | $Co^{+2}$ | $Co^{+3}$ | $Al^{+3}$ | $Fe^{+3}$ | $Mn^{+2}$ | $Mn^{+3}$ | $Ni^{+2}$ | $Zn^{+2}$ |
| Weight Complex | 0.15 | 0.07 | 0.07 | 0.30 | 0.04 | 0.20 | 0.20 | 0.25 | 0.07 |
| ppm Metal | 360 | 160 | 116 | 249 | 64 | 434 | 312 | 570 | 174 |
| Reactivity | | | | | | | | | |
| Minutes to gel: | | | | | | | | | |
| at 220° F. | 60 | 190 | 240 | 210 | 35 | 20 | 20 | 80 | 20 |

TABLE II-continued

EFFECT OF METAL ACETYLACETONATE ON BISPHENOL A DICYANATE HOMOPOLYMER PROPERTIES

|  | A | B | C | D | E | F | G | H | I |
|---|---|---|---|---|---|---|---|---|---|
| at 350° F. | 2.0 | 4.0 | 4.0 | 4.0 | 1.5 | 0.83 | 1.17 | 3.5 | 0.83 |
| Gel Time Ratio (220° F./350° F.) | 30 | 48 | 60 | 52 | 23 | 24 | 17 | 23 | 24 |
| Cured-State Properties |  |  |  |  |  |  |  |  |  |
| % Conversion via FTIR | 96.6 | 95.7 | 95.8 | 96.8 | 96.5 | 93.8 | 95.0 | 96.0 | 95.8 |
| HDT, 20 C. |  |  |  |  |  |  |  |  |  |
| Dry | 244 | 243 | 248 | 238 | 239 | 242 | 241 | 241 | 243 |
| Wet | 175 | 193 | 189 | 157 | 143 | 163 | 174 | 182 | 182 |
| % $H_2O$ Absorption | 1.70 | 1.41 | 1.40 | 1.77 | 1.76 | 1.67 | 1.54 | 1.52 | 1.45 |
| Flexure Strength, KSI | 25.2 | 25.9 | 18.4 | 18.1 | 20.7 | 22.7 | 23.0 | 17.3 | 22.9 |
| Flexural Modulus, MSI | 0.43 | 0.45 | 0.45 | 0.42 | 0.43 | 0.43 | 0.42 | 0.45 | 0.44 |
| Flexural Strain, % | 7.7 | 6.7 | 5.5 | 4.6 | 5.3 | 6.0 | 6.3 | 4.8 | 6.0 |
| % Weight Loss in 450° F. Air |  |  |  |  |  |  |  |  |  |
| 23 hours | 0.31 | 0.27 | 0.26 | 0.31 | 0.32 | 0.26 | 0.23 | 0.31 | 0.31 |
| 140 hours | 0.68 | 0.55 | 0.56 | 0.75 | 0.74 | 0.63 | 0.57 | 0.67 | 0.64 |
| % Weight Gain in Boiling $H_2O$ |  |  |  |  |  |  |  |  |  |
| 88 hours | 1.84 | 1.54 | 1.61 | 1.92 | 1.97 | 1.86 | 1.76 | 1.67 | 1.70 |
| 364 hours | 2.19 | 2.14 | 2.22 | 2.16 | 2.22 | 2.40 | 2.27 | 2.19 | 2.27 |

EXAMPLE 3

Using the same procedure and tests as in Example 2 (except that percent weight loss was measured in 460° F. air and the cure conditions were varied), the dicyanate ester of Bisphenol A was cured with catalyst solutions of copper acetylacetonate and nonylphenol in which the amount of nonylphenol was varied. The amounts of each component in the catalyst solutions and the cured properties of the dicyanate ester are listed in Table III.

TABLE III

EFFECT OF NONYLPHENOL LEVEL AND CURE TEMPERATURE ON BISPHENOL A DICYANATE HOMOPOLYMER PROPERTIES

|  | A | B | C | D | E | F | G | H | I | J | K | L |
|---|---|---|---|---|---|---|---|---|---|---|---|---|
| Composition (parts by weight) |  |  |  |  |  |  |  |  |  |  |  |  |
| Dicyanate Prepolymer | 100 | 100 | 100 | 100 | 100 | 100 | 100 | 100 | 100 | 100 | 100 | 100 |
| Catalyst Blend: |  |  |  |  |  |  |  |  |  |  |  |  |
| Nonylphenol | — | — | — | 2 | 2 | 2 | 4 | 4 | 4 | 6 | 6 | 6 |
| Copper Acetylacetonate | 0.15 | 0.15 | 0.15 | 0.15 | 0.15 | 0.15 | 0.15 | 0.15 | 0.15 | 0.15 | 0.15 | 0.15 |
| Methylene Chloride | 6(a) | 6(a) | 6(a) | — | — | — | — | — | — | — | — | — |
| Reactivity and Cure |  |  |  |  |  |  |  |  |  |  |  |  |
| Minutes to Gel at 250° F. | 45 | 45 | 45 | 32 | 32 | 32 | 30 | 30 | 30 | 28 | 28 | 28 |
| Hours Cure at: |  |  |  |  |  |  |  |  |  |  |  |  |
| 350° F. | 3 | 2 | 1 | 3 | 2 | 1 | 3 | 2 | 1 | 3 | 2 | 1 |
| 410° F. | — | 2 | 1 | — | 2 | 1 | — | 2 | 1 | — | 2 | 1 |
| 482° F. | — | — | 2 | — | — | 2 | — | — | 2 | — | — | 2 |
| % Conversion via FTIR | 72.3 | 91.4 | 96.3 | 91.7 | 93.8 | 97.1 | 90.8 | 95.8 | 98.8 | 90.0 | 95.6 | 99.7 |
| HDT, °C. |  |  |  |  |  |  |  |  |  |  |  |  |
| Dry | 149 | 215 | 235 | 192 | 226 | 248 | 185 | 277 | 242 | 165 | 220 | 229 |
| Wet | 126 | 145 | 138 | 155 | 160 | 154 | 153 | 158 | 156 | 140 | 156 | 165 |
| % $H_2O$ Absorption | 1.6 | 1.9 | 2.1 | 1.3 | 1.6 | 1.9 | 1.3 | 1.6 | 1.7 | 1.1 | 1.5 | 1.5 |
| Flexure Strength, KSI | 21.0 | 23.7 | 23.9 | 24.1 | 23.3 | 20.1 | 20.0 | 21.4 | 20.2 | 22.1 | 21.8 | 23.8 |
| Flexural Modulus, MSI | 0.49 | 0.44 | 0.40 | 0.46 | 0.43 | 0.40 | 0.45 | 0.42 | 0.40 | 0.48 | 0.44 | 0.41 |
| Flexural Strain, % | 4.3 | 6.3 | 9.6 | 5.9 | 4.8 | 5.6 | 4.6 | 6.0 | 4.8 | 5.0 | 6.0 | 8.4 |
| Specific Gravity, 25/25° C. | 1.222 | 1.212 | 1.207 | 1.204 | 1.203 | 1.197 | 1.207 | 1.200 | 1.200 | 1.205 | 1.189 | 1.190 |
| Wt. Loss in 460° F. Air |  |  |  |  |  |  |  |  |  |  |  |  |
| 16 |  | 0.35 | 0.42 | 0.61 | 0.30 | 0.38 | 0.51 | 0.27 | 0.41 | 0.52 | 0.23 | 0.42 | 0.52 |

TABLE III-continued
EFFECT OF NONYLPHENOL LEVEL AND CURE TEMPERATURE ON BISPHENOL A DICYANATE HOMOPOLYMER PROPERTIES

| | A | B | C | D | E | F | G | H | I | J | K | L |
|---|---|---|---|---|---|---|---|---|---|---|---|---|
| hours 446 hours | 3.71 | 3.41 | 3.26 | 1.68 | 1.75 | 1.79 | 1.56 | 1.86 | 1.93 | 1.53 | 1.85 | 1.93 |
| Wt. Gain in Boiling $H_2O$ | | | | | | | | | | | | |
| 66 hours | 2.3 | 2.2 | 2.3 | 1.6 | 1.9 | 2.0 | 1.6 | 1.8 | 1.85 | 1.5 | 1.7 | 1.6 |
| 338 hours | 5.4 | 2.7 | 2.7 | 2.2 | 2.3 | 2.3 | 2.3 | 2.1 | 2.1 | 2.3 | 2.0 | 1.8 |
| 740 hours | (b) | 3.7 | 3.4 | 2.3 | 2.4 | 2.5 | 2.4 | 2.3 | 2.2 | 2.6 | 2.1 | 2.0 |

(a) Methylene Chloride was removed by vacuum distillation.
(b) Blistered and whitened

EXAMPLE 4

Various thermoplastic resins were blended with 4,4'-Dicyanatodiphenyl ether prior to the addition of a copper acetylacetonate catalyst solution. The first polymer blend consisted of Ultem 1000, which is a polyetherimide available from the General Electric Company and has a Tg of 220° C., a tensile strength of 15,200 psi, a flexure strength of 21,000 psi, a specific gravity of 1.27 and a general formula of:

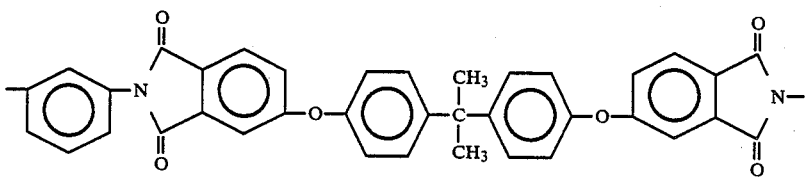

The second blend consisted of the dicyanato diphenyl ether and Durel 400 which is a polyarylate available from Celanese Engineering Resins having a Tg of 179° C., a tensile strength of 10,000 psi, a flexure strength of 14,500 psi, a specific gravity of 1.21 and a general formula of:

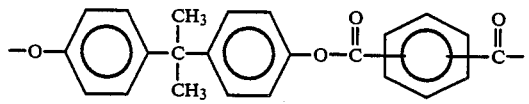

The thermoplastic resins were first dissolved in methylene chloride by heating and stirring the thermoplastic resin in a three-neck flask. The dicyanate was then added to the solution and the methylene chloride was distilled off at 250° F. under vacuum. The vacuum was then broken and the resin cooled to 220° F. Next, 6.57 grams of a catalyst solution was added. The catalyst solution was prepared by heating and stirring 6.5 grams of nonylphenol at 250° F. with 0.07 grams of copper acetylacetonate until all of the metal chelate had dissolved. The liquid catalyst was added to the molten resin and the blend was agitated for three minutes, vacuum deaired, poured into a ⅛ inch sheet mold which was preheated to 250° F. a nd then gelled at 250° F. (40 minutes to gel). The cyanate/thermoplastic blend was cured for three hours at 350° F. and one hour at 450° F. The amounts of resins and catalyst as well as the properties of the cured resins is shown in Table IV.

TABLE IV
EFFECT OF THERMOPLASTIC RESIN BLENDS ON 4,4'-DICYANTO DIPHENYL ETHER

| | A | B |
|---|---|---|
| MATERIAL (parts) | | |
| Ultem 1000 (Polyetherimide) | 21.8 | — |
| Durel 400 (Polyarylate) | — | 21.8 |
| Methylene Chloride | 85.0 | 85.0 |
| 4,4'-Dicyanatodiphenyl ether | 160.0 | 160.0 |
| Copper Acetylacetonate | 0.07 | 0.07 |
| Nonylphenol | 6.5 | 6.5 |
| PROPERTIES OF CURED CASTINGS | | |
| HDT (°C.) | | |
| Dry | 216 | 215 |
| Wet(a) | 160 | 154 |
| % $H_2O$ Absorption(a) | 1.44 | 1.58 |
| Tensile Strength, psi | 15,416 | 13,738 |
| Tensile strain-at-break % | 6.9 | 5.1 |
| Tensile Modulus, $10^6$ psi | 0.40 | 0.39 |
| Flexure Strength, psi | 22556 | 21559 |
| Flexure strain-at-break % | 8.00 | 7.82 |
| Flexure Modulus, $10^6$ psi | 0.43 | 0.40 |
| GIC (In-lbs/in²)(b) | | |
| Initiation | 3.68 | 2.62 |
| Propagation | 2.39 | 2.65 |

(a) Conditioned 64 hours at 200° F. and >95 percent R.H.
(b) GIC, strain energy release rate in the crack opening mode, was determined by the double torsion method.

The examples demonstrate that a dicyanate cured with a metal acetylacetonate has a significantly higher latency (i.e. the ratio of the gel time at 220° F. divided by the gel time at 350° F.) than a dicyanate cured with a metal naphthenate. Metal acetylacetonate cured castings also have higher heat distortion temperatures before post curing than metal naphthenate cured castings.

The examples also demonstrate that a catalyst solution comprised of metal acetylacetonate catalyst dissolved in an alkylphenol is better than one comprised of a metal acetylacetonate dissolved in an inert solvent, such as methylene chloride. When an alkylphenol is employed with the metal acetylacetonate, the conversion of a polycyanate ester to a trimerized polymer is higher, as is the heat distortion temperature and resistances to moisture and hot air exposure, than when an inert solvent is employed in the catalyst solution.

What is claimed:

1. A curable composition comprising a polycyanate ester of a polyhydric phenol and a catalyst comprising a liquid solution of a metal acetylacetonate in an alkylphenol wherein the metal is a coordinating metal and wherein the alkylphenol has 1 or 2 alkyl substituents ortho or para to the phenol group and wherein the alkyl groups contain a total of one to about 22 carbon atoms.

2. The composition of claim 1 wherein the metal is present in the range of about 10 to about 10,000 ppm metal based on the total weight of the ester.

3. The composition of claim 1 wherein the metal is present in the range of about 30 to about 600 ppm metal based upon the total weight of the ester.

4. The composition of claim 1 wherein the alkylphenol is present in the amount of about 2 to about 100 milliequivalents of active hydrogen per equivalent of cyanate group.

5. The composition of claim 4 wherein the alkylphenol is present in the amount of about 5 to about 60 milliequivalents of active hydrogen per equivalent of cyanate group.

6. The composition of claim 1 wherein the concentration of metal acetylacetonate dissolved in alkylphenol is in the range of about 0.05 percent to about 25 percent by weight based upon the total weight of the metal acetylacetonate and alkylphenol.

7. The composition of claim 1 wherein the coordinating metal is a transition metal having nine or more electrons in its next-to-outermost shell or aluminum.

8. The composition of claim 1 wherein the coordinating metal is selected from the group consisting of divalent copper, manganese, tin, lead, cobalt and nickel, trivalent iron, cobalt, manganese and aluminum, and tetravalent titanium.

9. The composition of claim 1 wherein the metal acetylacetonate is copper acetylacetonate.

10. The composition of claim 1 wherein the alkylphenol is selected from the group consisting of nonylphenol, dodecylphenol, o-cresol, 2-sec.butylphenol and 2,6-dinonylphenol.

11. The composition of claim 1 wherein the alkylphenol is nonylphenol.

12. The composition of claim 1 wherein the polycyanate ester is the dicyanate ester of Bisphenol A or a prepolymer thereof.

13. The composition of claim 1 wherein up to 70 weight percent of the polycyanate ester of the polyhydric phenol is replaced with a glycidyl ether of a polyhydric phenol.

14. The composition of claim 13 wherein the glycidyl ether is the diglycidyl ether of p,p'-dihydroxydiphenyl propane.

15. The composition of claim 1 wherein up to about 25 percent of the polycyanate ester of the polyhydric phenol is replaced with an amorphous thermoplastic resin.

16. The composition of claim 15 wherein between about 10 and about 20 percent of the polycyanate ester is replaced with the thermoplastic resin.

17. The composition of claim 15 wherein the thermoplastic resin is a polyetherimide, polyarylate, copolyester, a polysulfone, or polycarbonate.

18. A process for preparing a cured composition which comprises mixing a polycyanate ester of a polyhydric phenol with a catalyst comprising a liquid solution of a metal acetylacetonate in an alkylphenol, wherein the metal is a coordinating metal and wherein the alkylphenol has 1 or 2 alkyl substituents ortho or para to the phenol group wherein the alkyl group contains a total of one to about 22 carbon atoms, and heating the mixture at a temperature of about 250° F. to about 450° F. for a time sufficient to cure the mixture.

19. The process of claim 18 wherein the mixture is cured by stepwise heating wherein the first step or gelatin step is conducted at a temperature of about 150° F. to about 350° F. and wherein the second step or curing step is conducted at a temperature of about 300° F. to about 450° F.

20. The process of claim 19 wherein the mixture is post-cured at a temperature of about 400° F. to about 500° F.

21. The process of claim 18 wherein the metal is present in the range of about 10 to about 10,000 ppm metal based on the total weight of the ester.

22. The process of claim 18 wherein the metal is present in the range of about 30 to about 600 ppm metal based upon the total weight of the ester.

23. The process of claim 18 wherein the alkylphenol is present in the amount of about 2 to about 100 milliequivalents of active hydrogen per equivalent of cyanate group.

24. The process of claim 23 wherein the alkylphenol is present in the amount of about 5 to about 60 milliequivalents of active hydrogen per equivalent of cyanate group.

25. The process of claim 18 wherein the concentration of metal acetylacetonate dissolved in alkylphenol is in the range of about 0.05 percent to about 25 percent by weight based upon the total weight of the metal acetylacetonate and alkylphenol.

26. The process of claim 18 wherein the coordinating metal is a transition metal having nine or more electrons in its next-to-outermost shell or aluminum.

27. The process of claim 18 wherein the metal is selected from the group consisting of divalent copper, manganese, tin, zinc, cobalt and nickel, trivalent iron, cobalt, manganese and aluminum, and tetravalent titanium.

28. The process of claim 18 wherein the metal acetylacetonate is copper acetylacetonate.

29. The process of claim 18 wherein the alkylphenol is selected from the group consisting of nonylphenol, dodecylphenol, o-cresol, 2-sec.butylphenol and 2,6-dinonylphenol.

30. The process of claim 18 wherein the alkylphenol is nonylphenol.

31. The process of claim 18 wherein the polycyanate ester is the dicyanate ester of bisphenol A or a prepolymer thereof.

32. The process of claim 18 wherein up to 70 weight percent of the polycyanate ester of the polyhydric phenol is replaced with a glycidyl ether of a polyhydric phenol.

33. The process of claim 32 wherein the glycidyl ether is the diglycidyl ester of p,p'-dihydroxydiphenyl propane.

34. The process of claim 18 wherein up to about 25 percent by weight of the polycyanate ester is replaced with an amorphous thermoplastic resin.

35. The process of claim 34 wherein about 10 to about 20 percent by weight of the polycyanate ester is replaced with the thermoplastic resin.

36. The process of claim 34 wherein the thermoplastic resin is a polyetherimide, polyarylate, copolyester, polysulfone or polycarbonate.

* * * * *